United States Patent [19]

Ishikawa

[11] Patent Number: 4,697,136
[45] Date of Patent: Sep. 29, 1987

[54] INVERTER SYSTEM FOR INPUTTING ALTERNATING CURRENT AND DIRECT CURRENT IN COMBINATION

[75] Inventor: Fumihiko Ishikawa, Kagawa, Japan

[73] Assignee: Shikoku Denryoku Kabushiki Kaisha, Takamatsu, Japan

[21] Appl. No.: 936,596

[22] Filed: Dec. 1, 1986

[30] Foreign Application Priority Data

Dec. 2, 1985 [JP] Japan .................................. 60-185758

[51] Int. Cl.$^4$ ................................................. G05F 1/00
[52] U.S. Cl. .................................... 323/267; 323/906; 363/34; 307/126
[58] Field of Search ..................... 363/34, 37; 323/267, 323/906; 307/2, 22, 32, 39, 72, 75, 115, 126

[56] References Cited

U.S. PATENT DOCUMENTS

| | | | |
|---|---|---|---|
| 4,283,673 | 8/1981 | Lieux | 323/267 X |
| 4,314,198 | 2/1982 | Rogers | 323/906 X |
| 4,390,940 | 6/1983 | Corbefin et al. | 323/906 X |
| 4,447,712 | 5/1984 | Covillion | 307/39 X |
| 4,604,567 | 8/1986 | Chetty | 323/906 X |

Primary Examiner—Peter S. Wong
Attorney, Agent, or Firm—Fleit, Jacobson, Cohn & Price

[57] ABSTRACT

An inverter system is disclosed for inputting an alternating current and a direct current in combination. This inverter system comprises an AC-DC converter to convert a received AC electric power from an AC electric power source to a DC electric power; a DC-AC converter to convert a thus converted DC electric power and a DC electric power from a DC electric power source to an AC electric power; a first switching means to open or close an electric circuit between an output side of the DC-AC converter and a first load; a second switching means to open or close an electric circuit between the AC electric power source to which a second load is connected and the output side of the DC-AC converter; and a controlling means for controlling opening and closing of the first and second switching means. When a electric power consumption of the first load is larger than an output of the DC electric power source, the controller closes the first switching means and opens the second switching means. When an operation of the first load is stopped, the controller opens the first switching means and closes the second switching means. When the electric power consumption of the first load is smaller than the output of the DC electric power source, the controller closes both the first and second switching means.

4 Claims, 1 Drawing Figure

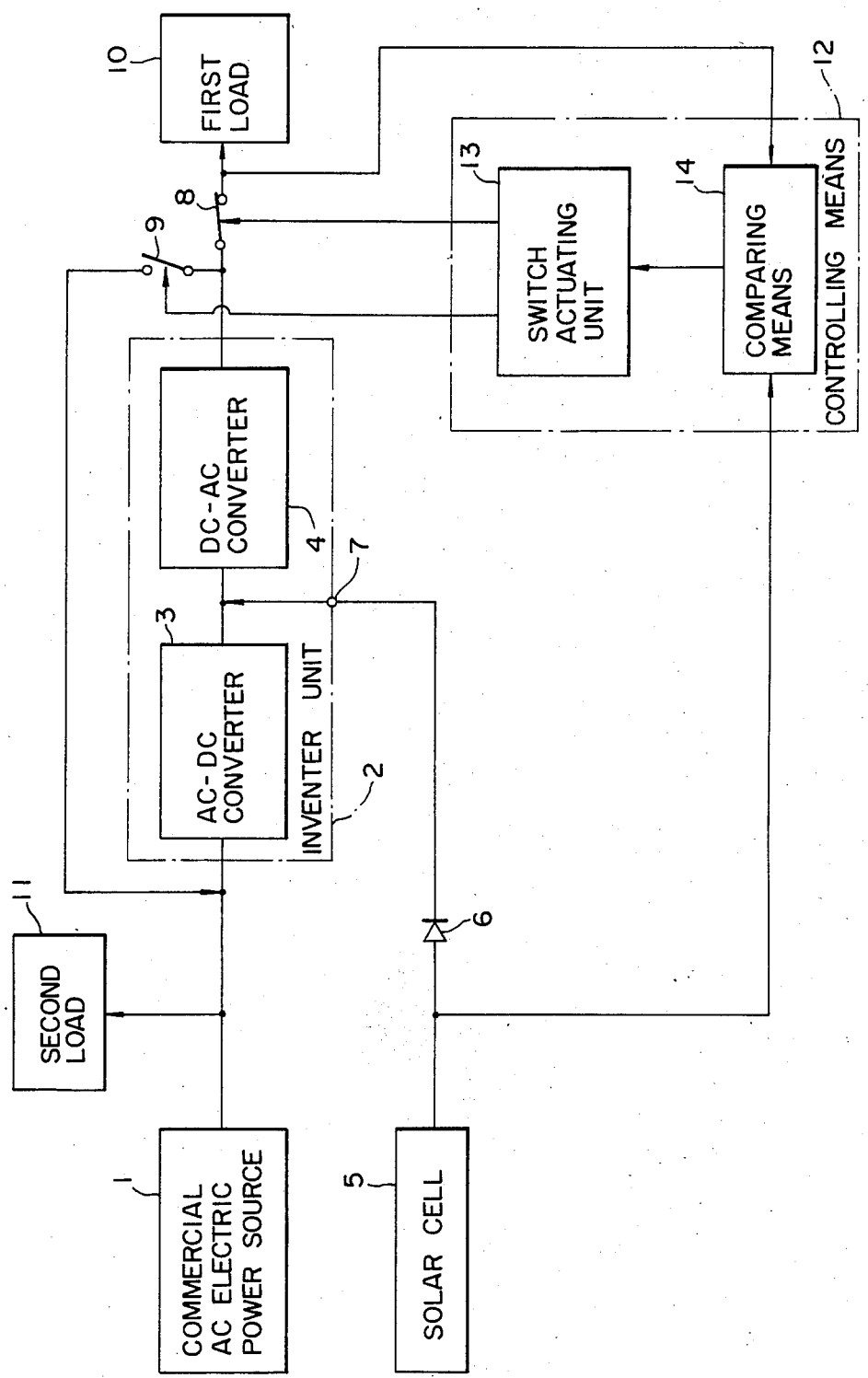

INVERTER SYSTEM FOR INPUTTING ALTERNATING CURRENT AND DIRECT CURRENT IN COMBINATION

BACKGROUND OF THE INVENTION

1. Field of the Invention

The present invention relates to an improvement of an inverter system for inputting alternating current(AC) and direct current(DC) in combination, which can convert AC electric power, for instance, from a commercial AC power source to DC electric power and further convert this DC electric power to AC electric power to be supplied to a load and which can convert DC electric power, for instance, from a DC electric power source such as a solar cell to be fed to a load. More particularly, the invention relates to an inverter system for inputting alternating current and direct current in combination, which is adapted to effectively use both an AC electric power source and a DC electric power source when the AC electric power source and the DC electric power source are used in combination.

2. Related Art Statement

Recently, solar cells have been spotlighted as one of substituting energies. Needless to say, the solar cells are to convert a solar energy to an electic energy, and therefore largely influenced by natural conditions of an area where the solar cells are placed. Thus, it is often difficult to handle the solar cells as in the case of general commercial AC electric power sources and special consideration is necessary therefore. That is, although an energy source of the solar cells is almost inexhaustible and therefore their use value is extremely high, on the other hand, the solar cells are difficult to handle because the output thereof is exclusively influenced by natural environment and is very variable. As a result, it is a current situation that it is extremely difficult for the solar cells to independently supply general loads such as home electric lights with electric power. For this reason, when the solar cells are intended to be used as the electic power supply sources, it is effective and reasonable to use them in combination with general electric power supply sources.

On the other hand, since the solar cell functions as a DC electirc power source, it can not be directly connected to an AC system. Therefore, an inverter is necessary for converting DC electric power to AC electric power.

Incidentally, most of general electric power loads are AC operable loads. In addition various kinds of AC electric powers have different number of phases, different voltages, and different frequencies have recently been required depending upon the kinds of loads, for instance, as in the case that a single phase electric light load and a three-phase air conditioner which has lately been propagated are simultaneously used in a single home.

Accordingly, a variety of inverter systems have up to now been developed to cope with such electric power requirement. A generally known inverter system comprises an AC-DC converter for once converting an AC electric power from a commercial AC electric power source to a DC electric power and a DC-AC converter for converting this DC electric power to an AC electric power having a specific frequency, a specific voltage, and a specific number of phase, and is adapted to supply the thus converted AC electric power to a load.

However, according to a conventional technique, when a solar cell is used as an electric power supply source, a DC-AC converter exclusively used for converting a DC electric power to an AC electric power has been provided separately from an inverter system for AC electic power source.

However, since such a conventinal technique a large cost for installing the exclusive use DC-AC converter, it has been a great barrier against public propagation of solar cells.

Under the circumstances, there has been proposed an inverter system in which DC electric power can be converted to AC electric power by connecting a DC electiric power source to a DC-AC converter of the inverter system.

But, such a construction has a problem that although the DC electric power source is always connected to the inverter system, the DC electric power source is not available when the operation of a load in the inverter system is stepped down, so that effective utilization of the DC electric power source, more specifically, flexibility between the solar cells and the load can not be attained.

SUMMARY OF THE INVENTION

It is therefore an object of the present invention to solve the above-mentioned problems possessed by the prior art techniques.

More specifically, the object of the present invention is to provide an inverter system for inputting AC and DC in combination, which is so constituted as to receive and convert an AC electric power inputted from an AC electric power source to a DC electric power and then receive and convert the thus converted DC electric power and a DC electric power inputted from a DC electric power source to an AC electric power, and comprises a first switching means for opening or closing an electric circuit between an output side to output this AC electric power and a first load to be connected to this output side, a second switching means for opening or closing an electric circuit between the AC electric power source connected to a second load and the output side to output the converted AC electric power, and a controller for controlling the electric circuit-opening and closing of the first switching means and the second switching means depending upon the magnitude of a electric power consumption of the first load and necessity of the operation of the first load.

According to the present invention, when the electric power consumption of the first load is larger than the output of the DC electric power source, the first switching means is closed, while the second switching means is opened. When the operation of the first load is stopped, the first switching means is opened, while the second switching means is closed. When the electric power consumption power of the first load is smaller than the output of the DC electric power source, the first switching means is closed and the second switching means is also closed. Thereby, flexibility in electric power between the DC electric power source and the AC electric power source can be rationally attained depending upon whether the output of the DC electric source is larger than the electric power consumption of the load or not.

These and other objects, features and advantages of the invention will be well appreciated upon reading of the invention when taken in conjunction with the attached drawing with understanding that some modifications, variations, and changes could be done by a skilled person in the art to which the invention pertains without departing from the spirit of the invention or the scope of claims appened hereto.

BRIEF DESCRIPTION OF THE DRAWING

For a better understanding of the invention, reference is made to a drawing which shows a block diagram of one embodiment of the inverter system for inputting AC and DC in combination according to the present invention.

DETAILED DESCRIPTION OF THE INVENTION

The present invention will be explained below with reference to the attached drawing.

In the drawing, a reference numeral 1 is, for instance, a commercial AC electric power source of a single phase, 100 V and 60 Hz. This AC electric power source 1 is connected to an AC-DC converter 3 in an inverter unit 2. The AC-DC converter 3 is connected to a subsequent DC-AC converter 4 in the inverter uniti 2. In the drawing, a reference numeral 5 is, for instance, a solar cell of 280 V of an open circuit output voltage and 500 W of an electric power output. The solar cell 5 is connected to a connection terminal 7 of the inverter unit 2 through a reverse current interrupting diode 6. The connection terminal 7 is connected to a connection point between the AC-DC converter 3 and the DC-AC converter 4.

On the other hand, a first and second switches 8 and 9 are connected to an output side of the inverter unit 2 as first and second switching means, respectively. The first switch 8 is connected to a subsequent first load 10 such as an air conditioner, while the second switch 9 is connected to an input side of the inverter unit 2. To the AC electric power source 1 is connected a second load 11, for instance, such as a refrigerator, an electric light, etc. of a single phase and 100 V. For instance, in the air conditioner as an example of the first load 10, a motor for its compressor as a simplist example is driven at a single phase, 100 V and 60 Hz, although the electric power consumption may vary.

In the meanwhile, the opening and closing of the first switch 8 and the second switch 9 are controlled by a switch actuating unit 13 constituting a controlling means 12. The switch actuating unit 13 is connected to a comparing means 14, which is adapted to receive an output of the solar cell 5 and the electric power consumption of the first load 10 and to compare them.

Next, operation of the thus constituted inverter system will be explained. For simplifying the explanation, for instance, internal losses of the AC-DC converter 3 and the DC-AC converter 4 in the inverter unit 2 are ignored.

As a first operation example, consideration is made of a case where the electric power consumption of the first load 10 is, for instance, 700 W, which is larger than the output (500 W) of the solar cell 5.

In this case, a sufficient electric power cannot be completely supplied to the first load 10 by means of the output of the solar cell 5 only. After the comparator 14 discriminates the magnitudes of the output of the solar cell 5 and the electric power consumption of the first load 10, according to a discrimination output thereof, the switch actuating unit 13 operates to close the first switch 8 and open the second switch 9. That is, while the output, 500 W, from the solar cell 5 is supplied to the first load 10, an underpower of 200 W is simultaneously supplied thereto from the commercial AC electric power source 1. In this case, the second load 11 is operated upon receipt of the electric power supply from the commercial AC electric power source 1.

As a second operation example, consideration is made of a case where the operation of the first load 10 is stopped.

This case is a case where the operation of the air conditioner is stopped for a long time period as in the spring season and the autumn season or a case where the operation is temporarily stopped even in the summer seacon or the winter season. Based on an output of the comparing means 14, the switch actuating unit 13 operates to open the first switch 8 and close the second switch 9. Therefore, in this case, the output of the solar cell 5 is returned to the input side of the inverter uniti 2 and supplied to the second load 11.

As a third operation example, consideration is made of a case where the electric power consumption of the first load 10 is, for instance, 400 W, which is smaller than the output (500 W) of the solar cell 5.

In this case, the output of the solar cell 5 suffices the first load 10. Based on an output of the comparing means 14, the switch actuating unit 13 operates to close the first switch 8 and also close the second switch 9. That is, 400 W of the output of the solar cell 5 is supplied to the first load 10, while the remaining excess electric power, 100 W, is returned to the side of the AC electric source and supplied to the second load 11.

In the above-mentioned embodiment, consideration has been made of the cases where the first load 10 and the second load 11 both require the same kind of the AC electric power source. The present invention can be applied to a case where the first load 10 requires a different kind of AC electric source, for instance, three phases, 200 V and 50 Hz, too. In this case, the DC-AC converter 4 is constituted to have a function to change the number of phase, voltage, and frequency.

Further, for instance, when the operation states of both the loads 10 and 11 are easily grasped and their operations are easy, the controlling means 12 in the above-mentioned embodiment may be constituted to be manually operated without being constituted by an electric circuit.

As mentioned in the above, according to the present invention, in the case where the inverter unit to which the AC electric power and the DC electric power may be inputted is used, two switching means are provided to open or close the electric circuits depending upon the quantitative relation between the output of the DC electric power source and the electric power consumption of the load. Therefore, particularly when the commercial AC electric power source and the solar cell are intended to be used in combination as electric power, an excess amount or an insufficient amount of the output of the solar cell with respect to the load system can be rapidly and appropriately coped with. Consequently, an exclusive DC-AC converter is not necessary unlike in the conventional techniques, so that cost may be lowered and the electric power sources can be advantageously utilized.

What is claimed is:

1. An inverter system for inputting an alternating current and a direct current in combication, which comprises:
    an AC-DC converter adapted to receive an DC electric power from an AC electric power source and to convert said AC electric power to a DC electiric power;

a DC-AC converter adapted to receive the DC electric power converted by said AC-DC converter and a DC electric power from a DC electric power source and to convert said DC electric powers thus received to an AC electric power;

a first switching means adapted to open or close an electric circuit between an output side of said DC-AC converter and a first load;

a second switching means adapted to open or close an electric circuit between said AC electric power source to which a second load is connected and the output side of said DC-AC converter; and a controlling means constituted such that when a electric power consumption of the first load is larger than an output of the DC electric power source, the controlling means closes the first switching means and opens the second switching means; when an operation of the first load is stopped, the controlling means opens the first switching means and closes the second switching means; and when the electric power comsuption of the first load is smaller than the output of the DC electric power source, the controlling means closes both of the first and second switching means.

2. An inverter system for inputting an alternating current and a direct current in combination according to claim 1, wherein said AC electric power source is a commercial AC electric power source and said DC electric power source is a solar cell.

3. An inverter system for inputting an alternating current and a direct current in combination according to claim 1, wherein said controlling means comprises a comparing means adapted to receive the output of the DC electric power source and the electric power consmption of the first load and to compare said output and said electric power consumption, and a switch actuating unit adapting to open or close the first switching means and the second switching means based on a comparison output from said comparing means.

4. An inverter system for inputting an alternating current and a direct current in combination according to claim 1, wherein a reverse current interrupting diode is arranged in an electric circuit between said DC electric power source and an input side of said DC-AC converter.

* * * * *